(12) United States Patent
Reddy et al.

(10) Patent No.: US 12,255,703 B2
(45) Date of Patent: Mar. 18, 2025

(54) ADAPTABLE MIMO CONFIGURATIONS BASED ON WIRELINE PARAMETERS IN WIRELESS-WIRELINE PHYSICALLY CONVERGED ARCHITECTURES

(71) Applicant: PHYTunes, Inc., Palo Alto, CA (US)

(72) Inventors: Akula Aneesh Reddy, San Jose, CA (US); Jisung Oh, Palo Alto, CA (US); Vinay Joseph, Kerala (IN)

(73) Assignee: PHYTunes, Inc., Palo Alto, CA (US)

( * ) Notice: Subject to any disclaimer, the term of this patent is extended or adjusted under 35 U.S.C. 154(b) by 131 days.

(21) Appl. No.: 17/952,559

(22) Filed: Sep. 26, 2022

(65) Prior Publication Data

US 2024/0106501 A1   Mar. 28, 2024

(51) Int. Cl.
  *H04B 7/0413*   (2017.01)
(52) U.S. Cl.
  CPC .................................. *H04B 7/0413* (2013.01)
(58) Field of Classification Search
  CPC .................................................... H04B 7/0413
  See application file for complete search history.

(56) References Cited

U.S. PATENT DOCUMENTS

| | | |
|---|---|---|
| 7,747,292 B2 | 6/2010 | Mezer et al. |
| 8,027,299 B2 | 9/2011 | Zuckerman et al. |
| 8,526,359 B2 | 9/2013 | Zuckerman et al. |
| 8,699,437 B2 | 4/2014 | Zuckerman et al. |
| 9,072,120 B2 | 6/2015 | Voschina et al. |
| 9,107,203 B2 | 8/2015 | Spagnolini et al. |
| 9,369,995 B2 | 6/2016 | Chakrabarti et al. |
| 9,497,116 B2 | 11/2016 | Chakrabarti et al. |
| 9,648,594 B2 | 5/2017 | Zuckerman et al. |
| 9,819,769 B2 | 11/2017 | Chakrabarti et al. |
| 9,918,327 B2 | 3/2018 | Lu et al. |
| 10,027,374 B1 | 7/2018 | Kinamon et al. |

(Continued)

FOREIGN PATENT DOCUMENTS

| | | |
|---|---|---|
| EP | 3108637 B1 | 2/2015 |
| EP | 3108638 B1 | 2/2015 |

(Continued)

OTHER PUBLICATIONS

Cioffi et al. "Cellular Subscriber Lines (CSL): A Wireless-Wireline Physically Converged Architecture"; Dec. 2020;pp. 1-23 (Year: 2020).*

(Continued)

*Primary Examiner* — Rahel Guarino
(74) *Attorney, Agent, or Firm* — Michael North; North Weber & Baugh

(57) ABSTRACT

Embodiments of the present invention provide systems, devices and methods for improving the performance and range of wireless-wireline communication systems. In certain examples, the architecture configures a MIMO antenna array at a distribution transceiver based on one or more parameters of a wireline segment coupled to the distribution transceiver. In various embodiments, the MIMO antenna array is configured based on bandwidth characteristics of a wireline segment such that system performance of the wireless-wireline system improves based on coordination of bandwidth parameters of each of the wireless and wireline segments.

20 Claims, 10 Drawing Sheets

(56) References Cited

U.S. PATENT DOCUMENTS

| | | | |
|---|---|---|---|
| 10,148,336 | B2 | 12/2018 | Kinamon et al. |
| 10,177,832 | B2 | 1/2019 | Kinamon et al. |
| 10,333,584 | B2 | 6/2019 | Spagnolini |
| 10,484,074 | B2 | 11/2019 | Kinamon et al. |
| 10,716,109 | B2 | 7/2020 | Zuckerman et al. |
| 11,303,346 | B2 | 4/2022 | Kinamon et al. |
| 2003/0012308 | A1 | 1/2003 | Sampath et al. |
| 2008/0151743 | A1 | 6/2008 | Tong et al. |
| 2008/0159421 | A1 | 7/2008 | Chen et al. |
| 2012/0264467 | A1 | 10/2012 | Maruta |
| 2014/0233672 | A1 | 8/2014 | Campos et al. |
| 2016/0249370 | A1 | 8/2016 | Lu et al. |
| 2016/0254889 | A1 | 9/2016 | Shattil |
| 2016/0337105 | A1 | 11/2016 | Lawton et al. |
| 2017/0373890 | A1 | 12/2017 | Fertonani et al. |
| 2018/0294903 | A1 | 10/2018 | Goodman et al. |
| 2018/0351601 | A1 | 12/2018 | Spagnolini |

FOREIGN PATENT DOCUMENTS

| | | | |
|---|---|---|---|
| EP | 3108675 | B1 | 2/2015 |
| EP | 3257165 | B1 | 2/2015 |
| EP | 2540134 | B1 | 10/2016 |
| WO | 2016128045 | A1 | 8/2016 |
| WO | 2018093301 | A1 | 5/2018 |
| WO | 2018207014 | A1 | 11/2018 |

OTHER PUBLICATIONS

J. Gambini and U. Spagnolini, "Wireless over Cable for Femtocell Systems," IEEE Communications Magazine, vol. 51, No. 5, pp. 178-185, May 13, 2013, (26 pgs).

S. Hassan et al., "On the Transport Capability of LAN Cables in All-Analog MIMO-RoC Fronthaul," in IEEE Wireless Communications & Networking Conference, Mar. 19, 2017, (6 pgs).

Matera et al., "Analog MIMO Radio-Over-Copper Downlink With Space-Frequency to Space-Frequency Multiplexing for Multi-User 5G Indoor Deployments," IEEE Transactions on Wireless Communication, vol. 18, No. 5, pp. 2813-2827, May 2019, (3 pgs).

Y. Huang et al., "LTE Over Copper—Potential and Limitations," in IEEE 26th International Symposium on Personal, Indoor and Mobile Radio Communications—(PIMRC): Mobile and Wireless Networks, Hong Kong, Aug. 30, 2015, (5 pgs).

J. Botha, "The FOA Outside Plant Fiber Optics Construction Guide", Fiber Optics Association, 2019, (6 pgs).

Handelsblatt Today, "Mobile carriers' next challenge: finding the money for 5G," 23, 2018. Available Online: <URL: https://www.handelsblatt.com/today/companies/200-300-billion-mobile-carriers-next-challenge-finding-the-money-for-5g/23581238.html?ticket=ST-48284083-y7IUF0e0vtVy0fr6CtsD-ap3>, (4 pgs).

European Telecommunications Standards Institute (ETSI), "Technical Specification 101 548; European Requirements for Reverse Powering of Remote Access Equipment, V2.1.1," ETSI, 650 Route des Lucioles F-06921 Sophia Antipolis Cedex—France, Sep. 2016, (102 pgs).

Hu, Y. Zhang et al., "Distributed Antenna Systems: Open Architecture for Future Wireless Communication", Boca Raton, Florida: Auerbach Publications, 2019. Available Online: <URL:https://books.google.com/books?hl=en&lr=&id=2RrbB17RYxoC&oi=fnd&pg=PP1&dq=H.+Hu,+Y.+Zha#v=onepage&q&f=false>. (1 pg).

"Common Public Radio Interface, CPRI, Requirements for the eCPRI Transport Network", Ericsson AB, Huawei Technologies Co. Ltd, NEC Corporation and Nokia, Oct. 24, 2017, (14 pgs).

5G PPP, "5G-Xhaul—Dynamically Reconfigurable Optical-Wireless Backhaul/Fronthaul with Cognitive Control Plane for Small Cells and Cloud-RANs," Horizon 2020 Program of European Commission, Jun. 30, 2016. Available Online: <URL:https://www.5g-xhaul-project.eu/publication_deliverables.html>, (1 pg).

A. Alimi et al., "Toward an Efficient C-RAN Optical Fronthaul for the Future Networks: A Tutorial on Technologies, Requirements, Challenges, and Solutions", IEEE Communications Surveys and Tutorials, vol. 20, No. 1, pp. 708-769, 2018, (3 pgs).

Cioffi et al., "Terabit DSLs (invited paper)", IEEE Communications Magazine, vol. 56, No. 11, pp. 152-159, Nov. 2018, (8 pgs).

International Search Report and Written Opinion of the International Searching Authority mailed Sep. 19, 2023 in related PCT application No. PCT/US2023/25640, (14 pgs).

Cioffi et al., "Cellular Subscriber Lines (CSL): A Wireless-Wireline Physically Converged Architecture", IEEE Xplore, Dec. 2020, available from the Internet: <URL:https://www.researchgate.netpublication/344050939_Cellular_Subscriber_Lines_CSL_A_Wireless-Wireline_Physically_Converged_Architecture (23 pgs).

Lee et al., "A Survey of Radio Resource Management for Spectrum Aggregation in LTE-Advanced", 2014, IEEE Communications Surveys & Tutorials, vol. 16, No. 2, pp. 745-760, available from the Internet: <URL: https://corac.uk/download/pdf/30340884.pdf>, (16 pgs).

J. M. Cioffi, "Digital Data Transmission", Jul. 3, 2020, Available from the Internet, <URL:https://web.stanford.edu/group/cioffi/book.pdf>, EE379ABC, EE479. Part I Modulation and Canonical Reception, (203 pgs). Chapters for EE379A: ch01, ch02, ch03, ch06. Chapters for EE379B: ch08, ch09, ch10, ch11. Chapters for EE379C: ch04, ch05. Chapters for EE479: ch12, ch13, ch14, ch15.

Chapter 02, EE379A. Coding Basics and multiple users, (211 pgs).

Chapter 03, EE379A. Equalization, (198 pgs).

Chapter 06, EE379A. Fundamentals of Synchronization, (97 pgs).

Chapter 08, EE379B. Part II Coding Basics and multiple users, (35 pgs).

Chapter 09, EE379B. Decoding Algorithms, (80 pgs).

S. Rabi et al., "A Wire Waveguide Channel for Terabit-Per-Second Links," Applied Physics Letters, Mar. 31, 2020, (5 pgs).

L. Miller, "Carrier Aggregation for Dummies", Hoboken, NJ: John Wiley & Sons, Inc. 2016, (28 pgs).

G. M. Garner, "IEEE 1588 version 2," in ISPCS, Ann Arbor, Sep. 24, 2008, (89 pgs).

3GPP TR 21.916, "Long Term Evolution—Release 16," in Release Description, Release 16, Dec. 2019, (4 pgs).

E. Perahia et al., "Next Generation Wireless Lans", Second Edition 802.11n and 802.11ac, vols. ISBN 978-1-107-01676-7, Cambridge University Press, Jun. 2013, (6 pgs).

High-Level Data Link Control, Jan. 9, 2020. Available Online: <URL: https://en.wikipedia.org/wiki/High-Level_Data_Link_Control>, [Accessed Feb. 7, 2020], (14 pgs).

Cioffi et al., "Optimum Equivalent Loading in Multi-Dimensional Transmission," IEEE Open Journal of the Communications Society, vol. 1, pp. 681-686, Jun. 8, 2020, (19 pgs).

Gamal et al., "Bounds on Capacity and Minimum Energy-Per-Bit for AWGN Relay Channels", IEEE Transactions on Information Theory, vol. 52, No. 4, pp. 1545-1561, Apr. 2006, 17pgs.

Intl Telecommunications Union, "G.998.4: Improved impulse noise protection for digital subscribeline (DSL) transceivers," Geneva, Switzerland, Mar. 27, 2019, (126 pgs).

Cioffi et al., "Ergodic Spectrum Management", invited paper, IEEE Transactions on Communications, vol. 68, No. 3, pp. 1794-1821, Mar. 2020, (28 pgs).

Starr et al., "DSL Advances", chapter 11, Upper Saddle River, NJ, Prentice Hall, 2003. (589 pgs).

Jagannathan et al., "Common-Mode Data Transmission Using the Binder Sheath in Digital Subscriber Lines", IEEE Tran. on Communications, vol. 57, No. 2, Feb. 2009, (11 pgs).

Heath et al., "Foundations of MIMO Communications", Cambridge University Press, UK, 2019, (803 pgs).

Paul Spruyt, "Achievements & Advancements in Next-Gen Copper Access", Nokia Fixed Networks, xDSL Strategies, the Netherlands, Jun. 26, 2019, (31 pgs).

Chapter 10, EE379B. Channel Coding, (143 pgs).

Chapter 11, EE379B. Code Concatenation And Advanced Codes, (69 pgs).

Chapter 4, EE379C. Multi-Channel Modulation, (172 pgs).

Chapter 5, EE379C. Generalized Decision Feedback Equalization, (188 pgs).

Chapter 12, EE479. Multi-User Fundamentals, (61 pgs).

(56) References Cited

OTHER PUBLICATIONS

Chapter 13, EE479. The Gaussian Vector Multiple Access Channel, (53 pgs).
Chapter 14, EE479. The Gaussian Vector Broadcast Channel, (40 pgs).
Chapter 15, EE479. The Gaussian Interference Channel, (34 pgs).
IEEE P1905 Working Group, "IEEE P1905-2013 Standard for a Convergent Digital Home Network for Heterogeneous Technologies," IEEE, Apr. 12, 2013, (93 pgs).
Matera et al., "Space-Frequency to Space-Frequency for MIMO Radio over Copper," in IEEE ICC SAC Symposium Access Systems and Networks Track, Paris, May 21, 2017, (6 pgs).
Kasturia et al., "Vector Coding for Partial Response Channels", IEEE Transactions on Information Theory, vol. 36, No. 4, pp. 741-762, Jul. 4, 1990, (22 pgs).
Bjornson et al., "Massive MIMO: Ten Myths and One Critical Question", IEEE Communications Magazine, pp. 114-122, Feb. 2016, arXiv:1503.06854v2, Aug. 18, 2015, (10 pgs).
Cendrillon et al., "Iterative Spectrum Balacing for Digital Subscriber Lines", in International Conference on Communications, Seoul Korea, May 2005, (6 pgs).
Lu et al., "Connecting the dots: small cells shape up for high-performance indoor radio", Ericsson Review, pp. 1-10, Dec. 19, 2014, (10 pgs).
Aldababsa et al., "A Tutorial on Nonorthogonal Multiple Access for 5G and Beyond", Wireless Communications and Mobile Computing, vol. 2018, pp. 1-24, Jun. 28, 2018, (25 pgs).
Cioffi et al., "Roadmap to Terabit DSLs", in TNO Conference, the Hague, Netherlands, Jun. 20, 2018, (23 pgs).
Ericsson AB, Huawei Technologies Co. Ltd, NEC Corporation, Alcatel Lucent, and Nokia Networks, "Common Public Radio Interface (CPRI); Interface Specification V7.0", Oct. 9, 2015. Available from the Internet: <URL:http://www.cpri.info/downloads/CPRI_v_7_0_2015-10-09.pdf>, (128 pgs).
Gambini et al., "Radio over Telephone Lines in Femtocell Systems", in 21st Annual IEEE International Symposium on Personal, Indoor, and Mobile Radio Communications, Istanbul, Turkey, Sep. 26, 2010, (6 pgs).
Fuyun Ling, "Synchronization in Digital Communication Systems", Cambridge University Press, Jun. 2, 2017, (399 pgs).
Zaidi et al., "5G Physical Layer, Principles, Models and Technology Components", London, Academic Press, ISBN: 978-0-12-814578-4, published 2018, (131 pgs, chapter 1-4).
Zaidi et al., "5G Physical Layer, Principles, Models and Technology Components", London, Academic Press, ISBN: 978-0-12-814578-4, published 2018, (183 pgs, chapter 5-9).
Stephen B. Wicker, "Error Control Systems for Digital Communication and Storage", Upper Sadde River, NJ, Prentice Hall, 1995, (pp. 1-93; 53 pgs).
Stephen B. Wicker, "Error Control Systems for Digital Communication and Storage", Upper Sadde River, NJ, Prentice Hall, 1995, (pp. 94-215; 56 pgs).
Stephen B. Wicker, "Error Control Systems for Digital Communication and Storage", Upper Sadde River, NJ, Prentice Hall, 1995, (pp. 216-337; 45 pgs).
Stephen B. Wicker, "Error Control Systems for Digital Communication and Storage", Upper Sadde River, NJ, Prentice Hall, 1995, (pp. 338-415; 40 pgs).
Stephen B. Wicker, "Error Control Systems for Digital Communication and Storage", Upper Sadde River, NJ, Prentice Hall, 1995, (pp. 416-493; 39 pgs).
Stephen B. Wicker, "Error Control Systems for Digital Communication and Storage", Upper Sadde River, NJ, Prentice Hall, 1995, (pp. 494-512; 10 pgs).
Chowdhury et al., "Hybrid Automatic Repeat Request in LTE", Rochester Institute of Technology, Dubai, U.A.E., Aug. 31, 2013, (17 pgs).
Non-final office action mailed May 25, 2022 in related U.S. Appl. No. 17/033,437, (49 pgs).
Non-final office action response filed in related U.S. Appl. No. 17/033,437, (49 pgs).
Notice of Allowance mailed Nov. 2, 2022 in related U.S. Appl. No. 17/033,437, (7 pgs).
Indian office action mailed Aug. 26, 2022 in related Indian application No. 202217022319, (5 pgs).
Response to Indian office action filed Oct. 26, 2022 in related Indian application No. 202217022319, (8 pgs).
Taiwanese office action mailed May 9, 2024 in related Taiwanese patent application No. 112136627, (30 pgs).
Response to Taiwanese office action filed Aug. 5, 2024 in related Taiwanese patent application No. 112136627, (3 pgs).
Taiwanese notice of allowance mailed Nov. 22, 2024 in related Taiwanese patent application No. 112136627, (4 pgs).

\* cited by examiner

ADAPTABLE MIMO CONFIGURATIONS BASED ON WIRELINE PARAMETERS IN WIRELESS-WIRELINE PHYSICALLY CONVERGED ARCHITECTURES

BACKGROUND

A. Technical Field

The present invention relates generally to telecommunication systems, and more particularly, to wireless and wireline communication architectures that improve performance of converged architectures by adapting antenna array configurations for wireless segments based at least in part on characteristics of an associated wireline segment.

B. Background of the Invention

One skilled in the art will understand the importance of wireless communication systems (including LTE, 5G, and Wi-Fi architectures) and the complexity of these systems as they are built out and maintained around the world. As the complexity of these systems increases and the resources available to them are allocated across an increasingly higher frequency spectrum, the management of wireless channels becomes more challenging. For example, a cellular base station must manage a large number of channels in communicating with UE (User Equipment) devices within its cell while the characteristics of these channels are constantly changing. The term "base station" may or may not include a cell tower. This management of channels becomes more challenging in dense cities in which wireless signals must traverse a variety of physical barriers to reach a UE such as a cellphone. This channel quality and range issue is particularly problematic when channel frequencies increase and are more sensitive to interference, noise and varying channel properties.

Cellular subscriber lines (hereinafter, "CSL") employ the novel concept of using the existing wireline infrastructure (e.g., telephone lines, fiber-optic cables, Ethernet wires, coaxial cables) in conjunction with the wireless infrastructure to extend the coverage of wireless signals quickly, inexpensively, and securely.

The architecture of the cloud-based CSL intermediate-frequency (hereinafter, "CSL-IF") and CSL radio-frequency (hereinafter, "CSL-RF") networks implements a unit at each of the two ends of the wireline connection: the CSL-IF unit IF-modulates the wireless baseband signal and transmits the modulated signal to a CSL-RF unit at the other end of the wire. The CSL-RF unit up-converts the signal for wireless transmission to nearby client devices, such as IoT devices and smartphones. The CSL-IF unit is interfaced with a baseband unit (hereinafter, "BBU") located at a cell-tower or at a central office of the CSP. The CSL-IF unit generates baseband digital streams from the BBU output (downlink) and converts the baseband digital streams to specific O-RAN split signals for the BBU input (uplink).

The wireline medium or cable connecting CSL-IF and CSL-RF units impacts CSL's performance. The cable is used for sending IF-modulated baseband signals to CSL-RF and CSL-IF sends received downlink samples after down-converting from radio frequency range to intermediate frequency. The CSL-RF may implement beamforming techniques to focus a wireless signal toward a recipient UE. This beamforming results in interference reduction within the cell (i.e., the CSL-RF service area) and improves power characteristics by focusing transmission power to the UE. One skilled in the art will recognize that the transmission characteristics of the wireline segments and the wireless segments of the CSL architecture may meaningfully vary.

Within this CSL architecture, managing bandwidth usage across the various segments is a problem. Interference and signal degradation occur within wireline and wireless transmission as a signal propagates through a wireless-wireline connection and may affect a variety of performance parameters including segment bandwidth. Accordingly, the performance of one segment may adversely affect the performance of another segment within this architecture and may reduce the performance of the overall system.

Accordingly, what is needed are systems, devices and methods that address the above-described issues.

SUMMARY OF THE INVENTION

Embodiments disclosed herein are systems, devices, and methods that can be used to provide improved performance (e.g., bandwidth, data rate, quality of service, etc.) on wireless-wireline connectivity by jointly managing wireline and wireless segments to achieve a preferred performance of the CSL architecture. In certain embodiments, bandwidth characteristics of a wireline segment are derived and/or measured and subsequently used to adapt configurable MIMO settings at a CSL-RF unit. For example, wireline bandwidth may be used to at least partially define MIMO parameters to better align the wireline bandwidth with wireless bandwidth used by the CSL-RF unit in downlink transmission to UEs. This coordination between wireline bandwidth and wireless MIMO parameters (that correspond to wireless bandwidth) results in improved performance across a wireless-wireline connection within the CSL architecture.

In certain embodiments, wireline bandwidth is used to determine whether an antenna array at a corresponding CSL-RF unit operates in a MIMO or SISO setting. If the wireline bandwidth is able to support a preferred operation of MIMO wireless downlink transmission at the CSL-RF, then control information is transmitted to the CSL-RF to effectively turn on MIMO operation. In yet further embodiments, the configurable MIMO setting may be further enhanced to operate at one or more layers of which the wireline bandwidth is able to support. Adjustments to MIMO parameters may be performed at initialization, intermittently during operation, responsive to bandwidth changes within a wireline segment, or in real-time.

Communication related to MIMO configurable parameters between a base station, BBU, CSL-IF and CSL-RF may be provided via a system control plane and/or embedded within control signals. It is important to note that, in the context of various embodiments of the invention, the term "base station" includes both base station installations that incorporate a cell tower as well as base station installations that do not include a cell tower.

In this document, the disclosures are presented in the context of, but are not limited to applications that use, the cellular subscriber line (CSL). Concepts related to the CSL are described in "Wireless-wireline physically converged architectures," U.S. Patent Publication No. 2021/0099277 A1; and J. M. Cioffi et al., "Wireless-wireline physically converged architectures," WIPO Patent Publication No. WO2021/062311, both of which are hereby incorporated by reference in their entireties. CSL systems use the existing wireline infrastructure (e.g., telephone lines, fiber-optic cables, Ethernet wires, coaxial cables, etc.) in conjunction with the wireless infrastructure to extend the coverage of wireless signals quickly, inexpensively, and securely. CSL systems can include hardware and/or software components to transmit and/or process signals at a variety of frequencies, including RF and IF.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for configuring MIMO parameters of a multi-antenna radio transmitter within a wireless and wireline architecture. In certain examples, the architecture leverages pre-existing wireline connectivity within a building to allow a signal to traverse physical barriers, such as walls, on the wireline segment(s) while using wireless portions of the channel to communicate signals in air both outside and inside the building. The properties of the wireline segment(s) will affect the manner in which the signal propagates including bandwidth and attenuation constraints. Determination of a multi-antenna radio transmitter located at the end of a wireline segment may be configured or adjusted based on the wireline properties and/or wireless properties within the wireless-wireline architecture. Appropriate MIMO configuration results in improved bandwidth utilization of the architecture as well as overall performance of channel transmissions within the architecture.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical components, circuits, devices and systems. The embodiments of the present invention may function in various different types of environments wherein channel sensitivity and range are adversely affected by physical barriers within the signal path. Furthermore, connections between components within the figures are not intended to be limited to direct connections. Rather, connections between these components may be modified, re-formatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
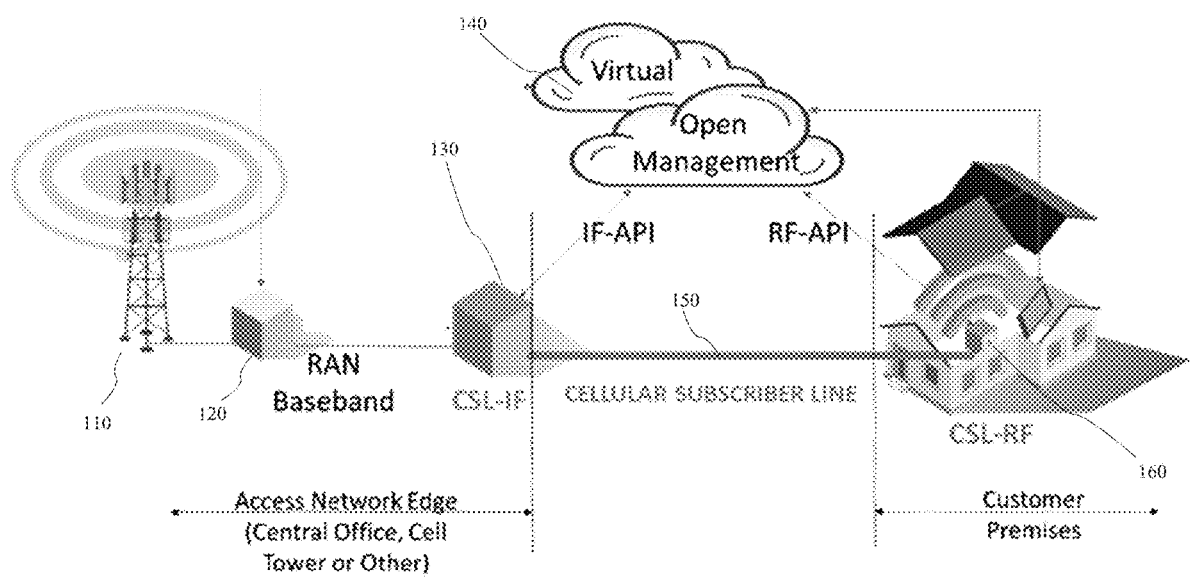
FIG. 1 illustrates a CSL cloud-based architecture that includes CSL-IF and CSL-RF units coupled to each other by a wireline cable (e.g., twisted pair, coaxial cable, etc.) in accordance to various embodiments of the invention.

FIG. 1 illustrates a CSL cloud-based architecture that includes CSL-IF and CSL-RF units coupled to each other by a wireline cable (e.g., twisted pair, coaxial cable, etc.) in accordance with various embodiments of the invention. The CSL-IF unit 130, which can be considered to be an intermediate transceiver, interfaces with a baseband unit ("BBU") 120 (or, more generally, a base station) 110 located, for example, at a cell-tower or at a central office of the cellular service provider (CSP). For purposes of this application the term "BBU" should be construed to cover a base station, central office, baseband unit or any other component operationally within a cell tower or cell tower system. The connection between the BBU 120 and the CSL-IF unit 130 may be a wired connection according to various embodiments of the invention.

The CSL-IF unit 130 receives baseband digital streams from the BBU output (downlink direction) and converts the baseband digital streams to specific O-RAN split signals for the BBU input (uplink direction). As previously mentioned, these O-RAN signals may be communicated via a cable or wireless channel(s). In the downlink direction, the CSL-IF unit 130 modulates the wireless baseband signal into intermediate frequency (IF) signal(s), and transmits the IF-modulated signal over the wireline cable 150 to a CSL-RF unit 160 at the other end of the wireline cable 150. The CSL-RF unit 160, which may be considered a distribution transceiver in certain embodiments, up-converts the received signal to RF signals and transmits the RF signals to one or more UEs (e.g., IoT devices, smartphones, etc.). Similarly, in the uplink direction, the CSL-RF unit 160 receives RF signals from a UE, down-converts these signals to the IF, and transmits IF-modulated signals over the wireline cable 150 to the CSL-IF unit 130.

The wireline cable 150 that couples the CSL-IF 130 and CSL-RF units 160 allows the CSL-IF 130 to send IF-modulated baseband signals to the CSL-RF unit 160. The CSL-IF unit 130 receives uplink samples from the CSL-RF unit 160, which had been down-converted by the CSL-RF unit 160 from the radio-frequency range to intermediate frequency. The wireline cable 150 has an impact on the performance of the CSL system. For example, wireline communication (over the cable) can be significantly impacted by cable attenuation and other types of signal degradation, which may be a function of cable length and frequency.

In certain embodiments, the CSL wireless-wireline architecture may be managed or partially managed by a cloud-based system or server 140. For example, an IF-API and RF-API provide connectivity to the cloud to enable remote management of system performance and integrity.

Figure 2:
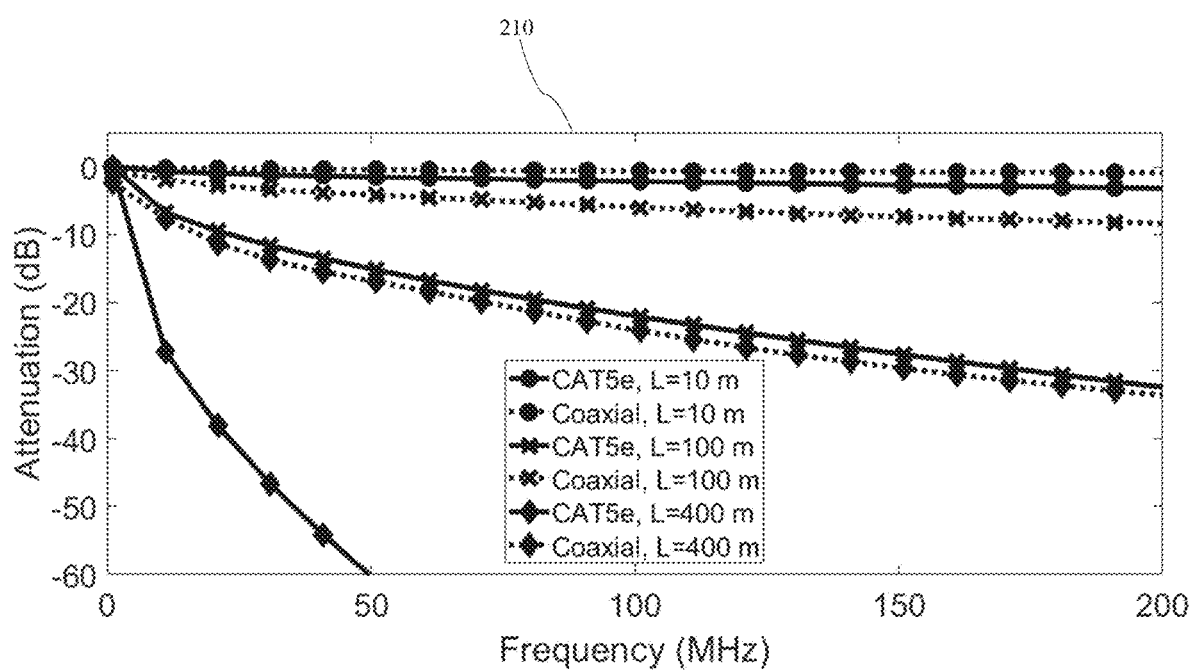
FIG. 2 is an exemplary plot comparing the attenuations of 10-meter, 100-meter, and 400-meter CAT5e and coaxial cables.

FIG. 2 is an exemplary plot comparing the attenuations of 10-meter, 100-meter, and 400-meter CAT5e and coaxial cables. This plot 210 illustrates that (1) higher frequencies experience more attenuation, (2) longer cables introduce more attenuation than shorter cables, and (3) trends (1) and (2) are impacted by the type of cable (e.g., CAT5e, coaxial, etc.).

When MIMO is used over the wireless segment in the system shown in FIG. 1, the CSL-IF unit 130 may transmit, to the CSL-RF unit 160, downlink baseband inputs that will be mapped into an array of transmit antennas for subsequent transmission to one or more UEs. Similarly, the CSL-RF unit 160 may transmit, to the CSL-IF unit 130, signals that were received at an array of receive antennas from the one or more UEs. The use of a MIMO antenna array increases bandwidth at the CSL-RF unit 160 in both uplink and downlink directions. Thus, relative to a single-input, single-output (SISO) approach, using MIMO over the wireless segment translates to sending more samples (corresponding to each of the multiple transmitters and multiple receivers) over the wireline medium 150 during the same duration. Support of MIMO over the wireless segment translates to an increased wireline bandwidth needed for signals sent between the CSL-IF unit 130 and the CSL-RF unit 160. Accordingly, bandwidth across the entire wireless-wireline link may be limited by the segment portion (wireline or wireless) with the lower bandwidth capabilities. In many instances, bandwidth across the wireline segment 150 may function as a bottleneck within the wireless-wireline link. In the case of bandwidth across the wireless segment, bandwidth at least partially depends on the MIMO configuration (e.g., the number of spatial streams used in the downlink direction and in the uplink direction). Accordingly, MIMO configurations at the CSL-RF unit 160 may be adapted relative to the bandwidth across the wireline segment in order to align bandwidth across each segment and improve overall performance of the CSL system.

The downlink throughput performance of the example system of FIG. 1 may be illustrated for transmission of 5G signals using time-division duplexing (TDD) over both the wireless segment and the wireline segment. The performance may be impacted by characteristics of the wireless and wireline portions of the system, such as, for example, cable type and cable length of the wireline portion of the system, and the MIMO configuration and Doppler spread of the wireless portion of the system. To illustrate these performance characteristics, several frames transmitted on a downlink (each of 10 ms duration) with 30 kHz subcarrier spacing (numerology 1) are provided below.

A TDL-A wireless channel is analyzed with bandwidth equal to either 20 MHz or 100 MHz, delay spread of 35 ns, and Doppler spread values of either 5 Hz or 15 Hz. Throughput in each case was evaluated as the maximum of throughputs achieved using the 28 modulation and coding schemes (MCSs) listed in MCS index table 2 for PDSCH in Table 5.1.3.1-2 of 3GPP Specification TS 38.214 v.15.3.0 (2018). The following three MIMO settings were considered: (a) 1 layer, 1 transmitter and 1 receiver (1×1); (b) 1 layer, 2 transmitters and 2 receivers (2×2); and (c) 2 layers, 2 transmitters and 2 receivers (2×2).

For the wireline portion of transmission, a transmit power of 10 dBm and noise power spectral density of −130 dBm/Hz were assumed, along with the cable attenuation models described above in the discussion of FIG. 2. One skilled in the art will recognize that these exemplary analyses are for illustrative purposes and should not limit the scope of the claimed invention.

Figure 3:
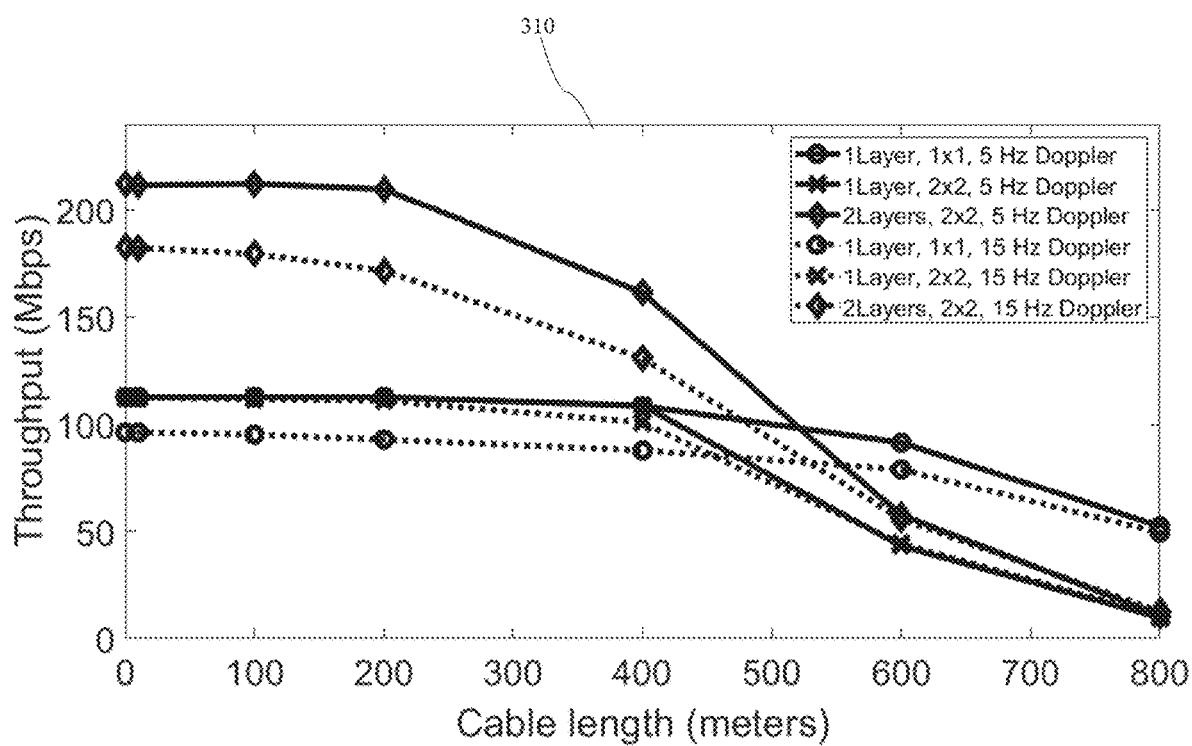
FIG. 3 illustrates examples of downlink throughput of the CSL portion of the system using CAT5e cable with the 5G bandwidth being 20 MHz (FIG. 3) according to various embodiments of the invention.
Figure 4:
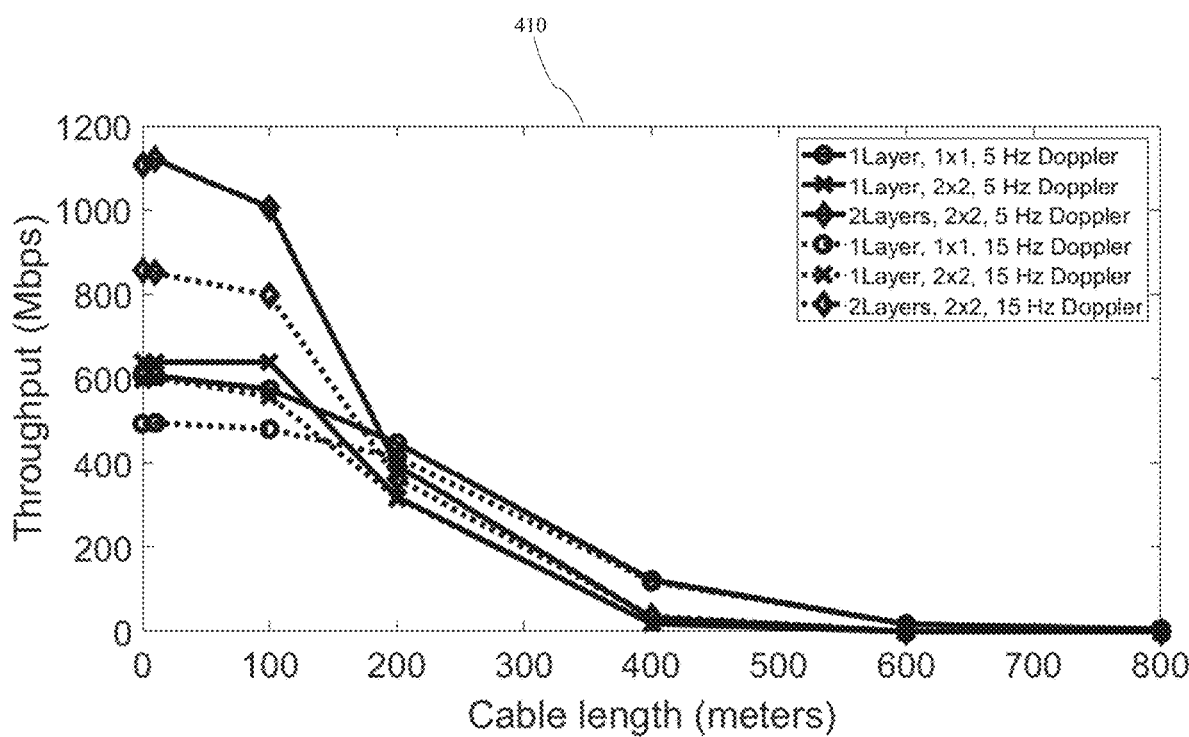
FIG. 4 illustrates examples of downlink throughput of the CSL portion of the system using CAT5e cable with the 5G bandwidth being 100 MHz according to various embodiments of the invention.

FIGS. 3 and 4 show examples of downlink throughput of the CSL portion of the system using CAT5e cables. The plot 310 in FIG. 3 shows downlink throughput using a CAT5e cable with 5G-related signal bandwidth being 20 MHz. The plot 410 in FIG. 4 shows downlink throughput using a CAT5e cable with 5G-related signal bandwidth being 100 MHz.

Figure 5:
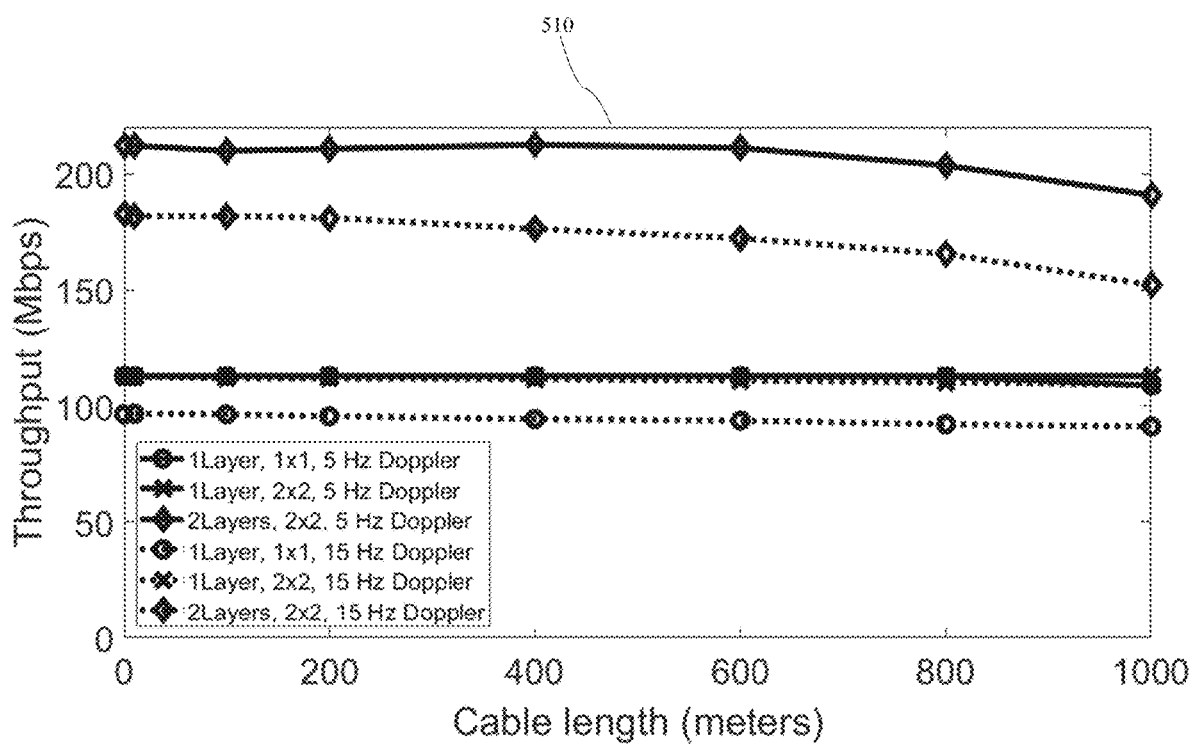
FIG. 5 illustrates additional examples of downlink throughput of the CSL portion of the system using a coaxial cable with 5G-related signal bandwidth being 20 MHz according to various embodiments of the invention.
Figure 6:
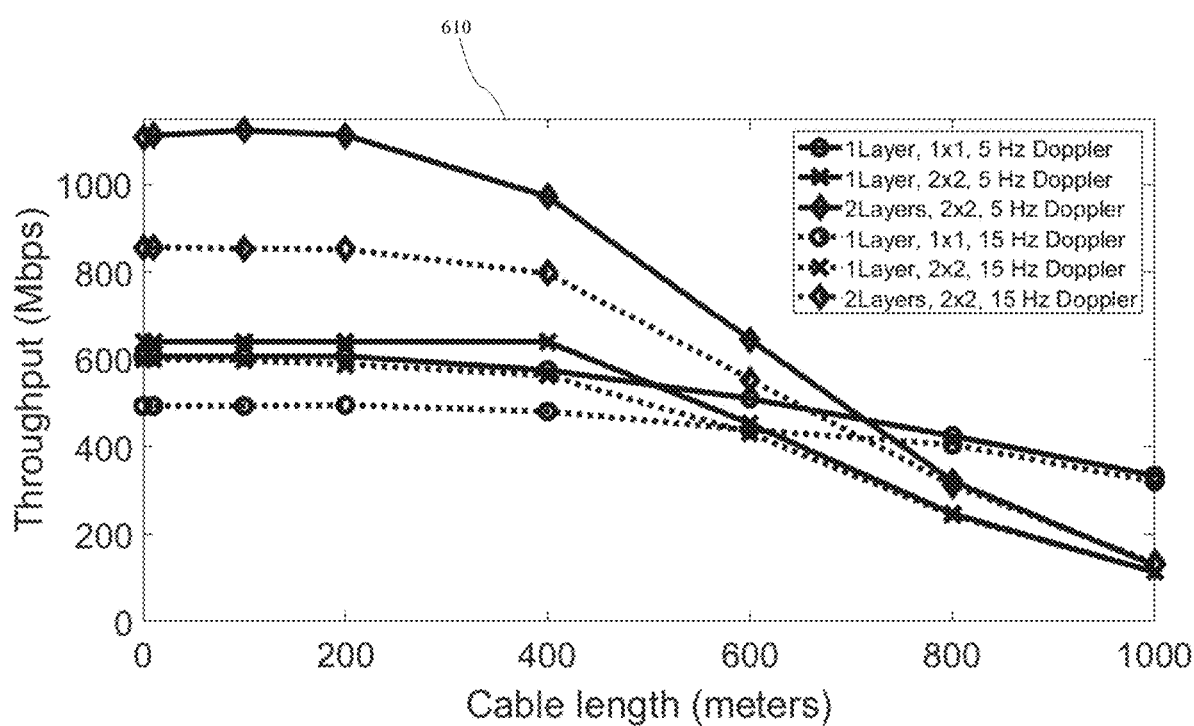
FIG. 6 illustrates further examples of downlink throughput of the CSL portion of the system using a coaxial cable with 5G-related signal bandwidth being 100 MHz according to various embodiments of the invention.

FIGS. 5 and 6 show other examples of downlink throughput of the CSL portion of the system using coaxial cables. The plot 510 in FIG. 5 shows downlink throughput using a coaxial cable with 5G-related signal bandwidth being 20 MHz. The plot 610 in FIG. 6 shows downlink throughput using a coaxial cable with 5G-related signal bandwidth being 100 MHz. As shown, CSL throughput generally decreases with increasing cable length because cable attenuation increases with increasing cable length, and that this trend is apparent for both cable types, both bandwidths, and certain configurations.

When the wireless portion of the example system of FIG. 1 uses a MIMO configuration, the throughput over a fading wireless channel is generally higher than that of a comparable SISO configuration because MIMO can provide spatial diversity gains and/or spatial multiplexing gains. The wireline throughput simulation results shown in FIGS. 3-6 and discussed above indicate that bandwidth across the wireline segment 130 may decay relative to certain parameters and create a bandwidth mismatch between a relatively higher wireless segment and relatively lower wireline segment. This bandwidth mismatch may result in decreased performance across the wireless-wireline link. The simulation results of FIGS. 3-6 also indicate that the gains or losses (e.g., performance improvements or degradations) with MIMO can be constrained due to bandwidth bottleneck across the wireline segment caused by cable-type, cable length, bandwidth used, portion of the spectrum used, etc. In other words, whether the use of MIMO over the wireless channel results in an overall performance improvement or degradation depends not only on the wireless segment, but also on the wireline segment. This counter-intuitive result means that it would be desirable to propose new methods for determining how to use MIMO on wireless-wireline links. Such methods are disclosed in the present specification.

One skilled in the art will recognize that the results shown in FIGS. 3-6 indicate that if MIMO is used with longer wireline cables, the performance of the system is worse than the performance using the SISO configuration. In other words, although MIMO configurations provide better throughput when the cables used by the wireline portion of the system are shorter, there is some cable length at which the throughput provided by MIMO configurations falls below the throughput provided by the SISO configuration.

FIG. 4 shows that the 2×2 MIMO (2 layers) configuration provides almost 1.8 times the throughput of the 1×1 SISO configuration for a CSL cable length of 10 meters in accordance with various embodiments of the invention. For a wireline cable length of 200 meters, however, the throughput of these two configurations is comparable. For wireline cable lengths longer than 200 meters, the SISO configuration outperforms the MIMO configurations. For example, at a cable length of 400 meters, the SISO configuration provides more than 3 times the throughput of the MIMO configurations. FIGS. 3 and 6 show similar performance data for cable lengths at which performance of the MIMO configurations starts to become worse than performance of the SISO configuration, and that on lengths longer than the crossover length, the performance of (at least one of) the MIMO configurations is lower than that of the SISO configuration.

The degradation in relative performance of the MIMO configurations is due to the higher wireline bandwidth required by MIMO and the decreasing amount of available bandwidth on the wireline segment as the cable length increases. Because a 2×2 MIMO configuration uses two antennas, whereas a SISO configuration uses only one antenna, the 2×2 MIMO configuration uses twice as much bandwidth as the SISO configuration to send downlink/uplink signals corresponding to the two antennas used (instead of just one antenna's signal sent in the case of SISO). Consequently, the MIMO signals experience more attenuation over the wireline medium because they span a larger bandwidth.

The performance difference between MIMO and SISO depends on factors that include, for example, the cable length and type, and the wireless bandwidth. One skilled in the art will recognize that other factors may affect bandwidth and other performance characteristics across the wireline segment, all of which may be considered in various embodiments of the invention. In certain situations, there is no cable length at which MIMO performs worse than SISO. For example, as shown in FIG. 5, the MIMO configurations provide higher performance than the SISO configuration for all simulated lengths of coaxial cable when the 5G-related signal bandwidth is 20 MHz.

The simulation results of FIGS. 3-6 indicate that, unlike in a wireless-only architecture, in which the system switches from a SISO configuration to a MIMO configuration to increase throughput, the system may not switch to a MIMO configuration in a wireless-wireline CSL architecture without potential performance reductions. In this CSL architecture, the BBU should take into account the wireline segment cable length and consider using MIMO configurations that use less wireline bandwidth (e.g., that provide fewer baseband streams) for longer CSL cable lengths. In certain embodiments, the BBU may implement one or more rules in determining whether to switch from a SISO configuration to a MIMO configuration. For example, a 2×2 MIMO configuration may only be used when the wireline segment cable length is less than a specified threshold length.

A comparison of FIGS. 4 and 6 indicates that the relative performance of MIMO when compared to SISO also depends on the type of cable used in the CSL portion of the system. Although the overall trend is the same for both CAT5e and coaxial cable (e.g., generally decreasing throughput with increasing cable length), the length at which SISO starts to outperform MIMO, referred to as the crossover cable length, can be different. For example, FIGS. 3-6 indicate that when the wireless bandwidth is 100 MHz, the crossover cable length is less than 200 meters for CAT5e cable but is more than 700 meters for coaxial cable. Consequently, MIMO configurations may be beneficial for longer coaxial cables when compared to CAT5e cables. Thus, in addition to considering cable length, the CSL-IF should also take into account the type of cable used in the CSL portion of the system when determining whether to use a SISO or MIMO configuration, and, in the case of MIMO, which MIMO configuration to use.

A comparison of FIGS. 3 and 4 indicates that the relative performance of MIMO when compared to SISO also depends on other parameters that affect the wireless channel's bandwidth. In particular, the figures show that for CAT5e cable, the crossover cable length is less than 200 meters when the wireless bandwidth is 100 MHz and more than 500 meters when the wireless bandwidth is 20 MHz. The difference in crossover cable length is due to the larger increase in wireline bandwidth consumption by the MIMO configuration when the wireless bandwidth is 100 MHz as compared to when the wireless bandwidth is 20 MHz. Accordingly, the BBU should also take into account the bandwidth of the wireless channel when determining whether to use a SISO or MIMO configuration, and, in the case of MIMO, which MIMO configuration to use.

One skilled in the art will also recognize that spectrum allocation of the bandwidth occupied by wireline signals in the cable can also impact performance. The band occupied by wireline signals can vary depending on whether other technologies (e.g., DSL, DOCSIS, etc.) are using the cable that is being used for wireline transmission. For example, if one or more other technologies already occupy the 0-100 MHz frequency range of the cable, the performance degradation relative to SISO due to the use of a MIMO configuration may be even larger because the use of MIMO will result in placement of the CSL signals at even higher frequencies in the wireline spectrum, which suffer from even higher attenuation (see, e.g., FIG. 2). As a result, the relative performance of a MIMO configuration as compared to a SISO configuration may be worse than indicated by FIGS. 3-6. In another example, the crossover cable length may be shorter than indicated in FIGS. 3-6, and/or the throughput may be lower than shown for a particular cable length. Thus, the CSL-IF may consider usage of the wireline cable by other technologies/services when determining whether to use a SISO or MIMO configuration, and, in the case of MIMO, which MIMO configuration to use.

Based on the foregoing, in wireless-wireline physically converged architectures, it would be desirable to adapt wireless segment MIMO configurations based on characteristics of the wireline segments in order to improve overall performance of the converged wireless-wireline system. The performance of the system may be measured, for example, by metrics such as throughput, SNR, quality of service, latency, etc. It may be desirable to be able to implement the adaptation without a significant impact on existing systems (e.g., systems already using the CSL cable). The MIMO configurations may be set at initialization, intermittently during operation, in response to one ore more performance parameters dropping below a threshold or in real time.

In various embodiments, disclosed herein are systems, devices, and methods to improve performance of wireless-wireline physically converged architectures by adapting wireless segment configurations based at least in part on wireline segment characteristics. These characteristics may include, for example, cable type, cable length, cable wire diameter, other services/technologies using the cable, etc. The adaptations may include, for example, changes to configurations of one or more wireless segments (e.g., switching from SISO to MIMO, changing a MIMO configuration, etc.). The adaptations may be to the configuration of a wireless segment between, for example, a base station and an intermediate transceiver, and/or to the configuration of a wireless segment (or multiple wireless segments) between a distribution transceiver and user transceivers (e.g., UEs).

In some embodiments, a method of adapting a configuration of a wireless portion of a wireless-wireline physically converged architecture comprises obtaining an indication of at least one characteristic of a wireline portion of the wireless-wireline physically converged architecture, and configuring at least one setting of the wireless portion of the wireless-wireline physically converged architecture based at least in part on the obtained indication of the at least one characteristic of the wireline portion of the wireless-wireline physically converged architecture. The at least one characteristic may be, for example, a type, size, or length of a cable of the wireline portion of the wireless-wireline physically converged architecture. As another example, the at least one characteristic may be an amount of unavailable (or available) bandwidth of the cable of the wireline portion of the wireless-wireline physically converged architecture. As yet another example, the at least one characteristic may be (or may be based on) an attenuation profile of a cable in the wireline portion of the wireless-wireline physically converged architecture.

The at least one setting of the wireless portion of the wireless-wireline physically converged architecture can be any setting that affects performance. For example, the setting may comprise or define a multiple-input, multiple-output (MIMO) configuration (e.g., one or more of a bandwidth, a number of layers, a number of transmitters, a number of receivers, etc.) that applies to the downlink direction, the uplink direction, or both.

The indication of the at least one characteristic can be obtained in any suitable way, such as, for example, by accessing a look-up table, or by measuring or observing the at least one characteristic (e.g., via an intermediate transceiver cooperating with a distribution transceiver to determine or measure the at least one characteristic, such as during an initialization procedure).

As discussed further below, one or more preferred configurations for the wireless portion of the wireless-wireline physically converged architecture can be determined based at least in part on the at least one characteristic of the wireline portion of the wireless-wireline physically converged architecture, and these one or more preferred configurations can be (or can be included in or identified by) the obtained indication of the at least one characteristic of the wireline portion of the wireless-wireline physically converged architecture. If one or more preferred configurations are identified or determined, the identification or determination can be performed, for example, by an intermediate transceiver, by a distribution transceiver, by another entity (e.g., an external server), or by some combination of the above. The one or more preferred configurations can be provided to (or obtained by) a base station (e.g., via an intermediate transceiver sending a message to the base station in an overhead channel), which can then implement a selected one of the one or more preferred configurations by configuring the at least one setting of the wireless portion of the wireless-wireline physically converged architecture so that the selected preferred configuration is implemented.

The one or more preferred configurations can be determined according to any suitable selection criterion or criteria, such as by prioritizing configurations based on one or more of: (a) the bandwidth they use (e.g., prioritizing configurations that use less bandwidth over those that use more bandwidth, or vice versa), (b) the length and/or type of cable in the wired portion of the wireless-wireline physically converged architecture (e.g., whether the cable length exceeds a threshold length, or whether the cable type is known to have high attenuation, etc.), (c) whether a cable in the wireline portion of the wireless-wireline physically converged architecture is used (or can be used) by another technology (thereby reducing the amount of bandwidth available), and/or (d) whether the amount of bandwidth available (or unavailable) over the wireline portion of the wireless-wireline physically converged architecture exceeds a threshold bandwidth. Preferred configurations can be identified through a table lookup (e.g., indexed by one or more of cable length, cable type, cable bandwidth, frequency bands available or unavailable on the cable, etc.).

In some embodiments, in determining a preferred configuration for a wireless segment, higher preference is given to one or more MIMO configurations that use less wireline bandwidth (e.g., with fewer baseband streams) when (a) the length of the CSL cable is above a threshold, and/or (b) a CSL cable type has relatively high attenuation (e.g., considering commonly-used cable types), and/or (c) the CSL cable is used by one or more other wireline technologies or systems (e.g., that use at least some part of the available spectrum). In some embodiments, a CSL entity (e.g., a CSL-IF unit) determines a preferred MIMO configuration and provides it to the BBU, which can then either set the MIMO configuration as directed, or take the preferred MIMO configuration into account when determining the wireless configuration.

There are a number of ways the preferred configuration can be determined. In some embodiments, the preferred configuration is determined as needed and/or is updated automatically/dynamically while the system operates (e.g., based on measurements made by the CSL units, whether during an initialization process or while transferring UE data).

In some embodiments, the preferred configurations are stored (e.g., at a CSL-IF or CSL-RF unit). As one example, a CSL system (e.g., a CSL-IF unit) can access a locally-stored, stored within cloud devices and servers, or otherwise available data store that defines preferred configurations (e.g., MIMO configurations) for combinations of cable type, cable length, wireless bandwidth, and/or bandwidth utilization by other technologies. For example, the preferred configurations can be defined by one or more tables, which may be preconfigured or determined/adjusted on-the-fly as the system operates. Separate tables can be used, for example, for different wireless bandwidths (e.g., one table defines preferred configurations for 20 MHz wireless bandwidth and a separate table defines preferred configurations for 100 MHz wireless bandwidth), and/or for different cable types (e.g., Table A for CAT5e, Table B for a particular coaxial cable or coaxial cable in general, etc.). In some embodiments, the preferred configurations are defined by tables that are preconfigured (e.g., based on measurements, service provider records, etc.). In some embodiments, the preferred configurations are defined by tables that are generated and/or updated automatically and/or dynamically based on measurements made by the CSL-IF unit and/or the CSL-RF unit.

As explained above, in some embodiments, a CSL entity (e.g., a CSL-IF unit, either alone or in cooperation with a CSL-RF unit) determines a preferred MIMO configuration and provides it to the BBU. In some such embodiments, the BBU implements the configuration. The CSL wireless-wireline system may suggest to the BBU that it avoid using a MIMO configuration by sending an explicit instruction to the BBU. Alternatively, or in addition, the CSL system can send the BBU a list of authorized or approved configurations, and this list may exclude non-preferred MIMO configurations that the BBU might otherwise be able to support. The CSL wireless-wireline system (e.g., via one or more messages from the CSL-IF to the BBU) may indicate its preferred configuration (e.g., by sending multiple configuration options in order of preference). The CSL wireless-wireline system may guide the BBU to choose or use a preferred configuration (or avoid a non-preferred configuration) by using a signaling interface between the CSL wireless-wireline system and the BBU. The signaling interface may be an existing signaling interface, or it may be a new signaling interface implemented to support the converged wireless-wireline architecture. Additionally, this signaling may occur on a wireless and/or a wireline connection and may occur in the control plane and/or data plane.

It is to be understood that a communication path allowing the CSL system to indicate its preferred configuration(s) (or non-preferred configuration(s)) to the BBU need not be provided by a direct connection between, for example, the CSL-IF and the BBU. For example, the CSL-IF and the BBU can communicate through an intermediary, such as a server in the cloud.

Figure 7:
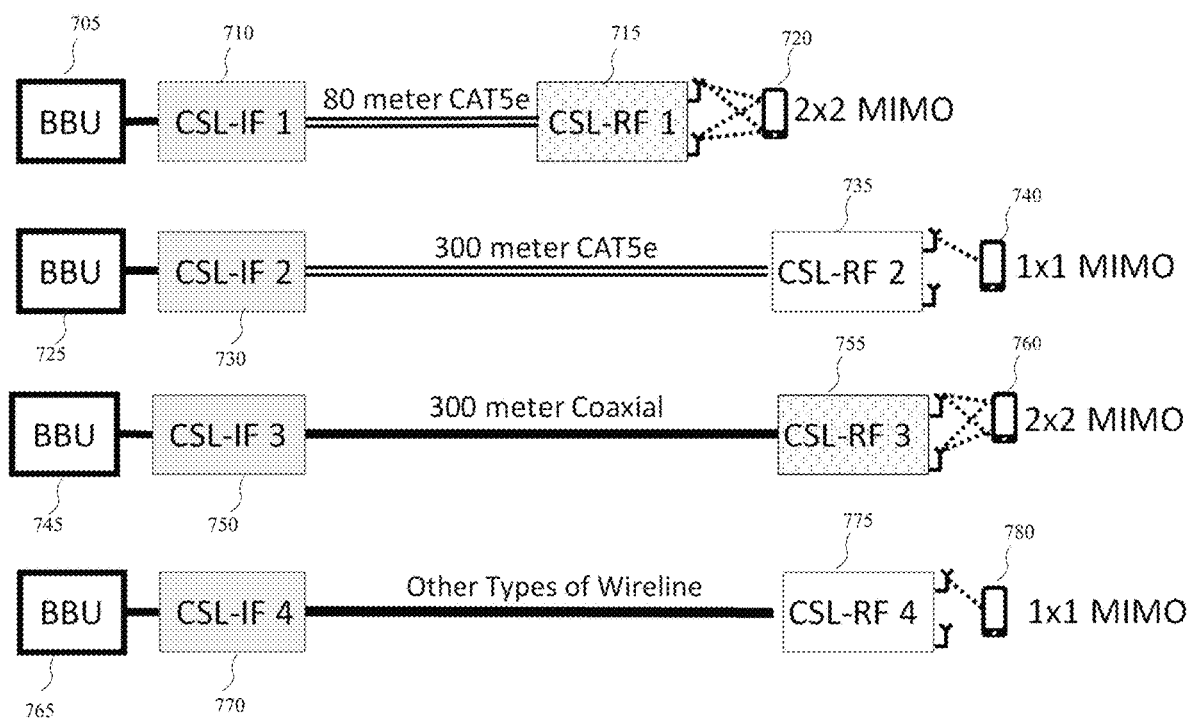
FIG. 7 illustrates examples of how the MIMO configuration of the wireless portion of the network can be adapted based at least in part on wireline parameters or characteristics according to various embodiments of the invention.

FIG. 7 illustrates examples of how the MIMO configuration of the wireless portion of the network can be adapted based at least in part on wireline parameters or characteristics. In a first example, the CSL-IF unit 710 ("CSL-IF 1") is coupled to a BBU 705 from which signals are received in a downlink direction and transmitted to in an uplink direction. The CSL-IF unit 710 is coupled to a CSL-RF unit 715 ("CSL-RF 1") by an 80-meter length of CAT5e cable. The CSL-RF 1 715 transmits and receives signals from a UE 720 using a configurable antenna array. Referring to FIGS. 3 and 4, for example, one skilled in the art will recognize that a 2×2 MIMO configuration offers the best performance. In a second example, the CSL-IF unit 730 ("CSL-IF 2") is coupled to a BBU 725 from which signals are received in a downlink direction and transmitted to in an uplink direction. The CSL-IF unit 730 is coupled to the CSL-RF unit 735 ("CSL-RF 2") by a 300-meter length of CAT5e cable. The CSL-RF 2 735 transmits and receives signals from a UE 740 using a configurable antenna array. FIG. 3 indicates that for this length of cable and a 5G bandwidth of 20 MHz, a 2×2 MIMO configuration also offers the best performance, but FIG. 4 indicates that if the 5G bandwidth is 100 MHz, a SISO configuration (1×1 MIMO) provides better performance than 2×2 MIMO configurations.

Referring to FIG. 7, a CSL-IF unit 750 ("CSL-IF 3") is coupled to a BBU 745 from which signals are received in a downlink direction and transmitted to in an uplink direction. The CSL-IF unit 750 is coupled to the CSL-RF unit 755 by a 300-meter length of coaxial cable. The CSL-RF 1 735 transmits and receives signals from a UE 740 using a configurable antenna array. Consistent with the process described above, FIGS. 5 and 6 indicate that for this length of coaxial cable, a 2×2 MIMO configuration provides better performance (e.g., throughput). The last example illustrates how the correlation between wireline type and length may be generically applied to determine a preferred MIMO configuration. In this last example, a CSL-IF unit 770 ("CSL-IF 4") is coupled to a BBU 765 from which signals are received in a downlink direction and transmitted to in an uplink direction. The CSL-IF unit 770 is coupled to the CSL-RF unit 775 ("CSL-RF 4") by any other type and length of wireline cable. The CSL-RF 4 775 transmits and receives signals from a UE 780 using a configurable antenna array. In this example, the use of a SISO configuration (1×1 MIMO) provides better performance than any 2×2 MIMO configuration and is identified by a similar process shown above. The conclusion that a SISO configuration provides better performance can be determined as described above (e.g., by results of simulations, based on experience or measurements, etc.).

Accordingly, in some embodiments, a wireless-wireline physically converged system has a wireline portion and a wireless portion. The wireline portion includes an intermediate transceiver (e.g., a CSL-IF unit), a distribution transceiver (e.g., a CSL-RF unit), and a cable coupling the intermediate transceiver to the distribution transceiver. The wireless portion includes at least one wireless segment communicatively coupling the distribution transceiver to at least one user transceiver (e.g., UE). The base station is configured to (i) obtain an indication of at least one characteristic of the wireline portion, and (ii) adjust at least one setting of the wireless portion based at least in part on the obtained indication of the at least one characteristic of the wireline portion. The setting can affect any aspect of the wireless portion of the system, including, for example, one or more of a bandwidth, a data rate, a coding, or a modulation of transmission over the first wireless segment or over the at least one second wireless segment. As explained previously, the at least one setting of the wireless portion can be a MIMO setting (e.g., a bandwidth, a number of layers, a number of transmitters, and/or a number of receivers) for the first wireless segment or for the second wireless segment (or both). The MIMO setting can apply to the downlink direction and/or the uplink direction.

As also explained above, the at least one characteristic can comprise a type, size, or length of the cable, an unavailable (or available) bandwidth of the cable, an attenuation profile of the cable (e.g., a plot, function, or table providing attenuation, insertion loss/gain, etc. as a function of frequency or at a set of frequencies or within certain frequency bands, etc.), or any other appropriate characteristic.

The intermediate transceiver can be configured to send the indication of at least one characteristic of the wireline portion to the base station (e.g., via an overhead channel, via server in the cloud, etc.). Similarly, the base station can be configured to retrieve the indication of the at least one characteristic of the wireline portion either directly from the intermediate transceiver or from a server located within a cloud. As another example, the base station can be configured to obtain the indication of the at least one characteristic of the wireline portion from a look-up table.

As explained above, the intermediate transceiver and/or the distribution transceiver may be able to determine (e.g., observe, measure, etc.) the at least one characteristic of the wireline portion (e.g., during an initialization procedure or at some other time or times).

Figure 8:
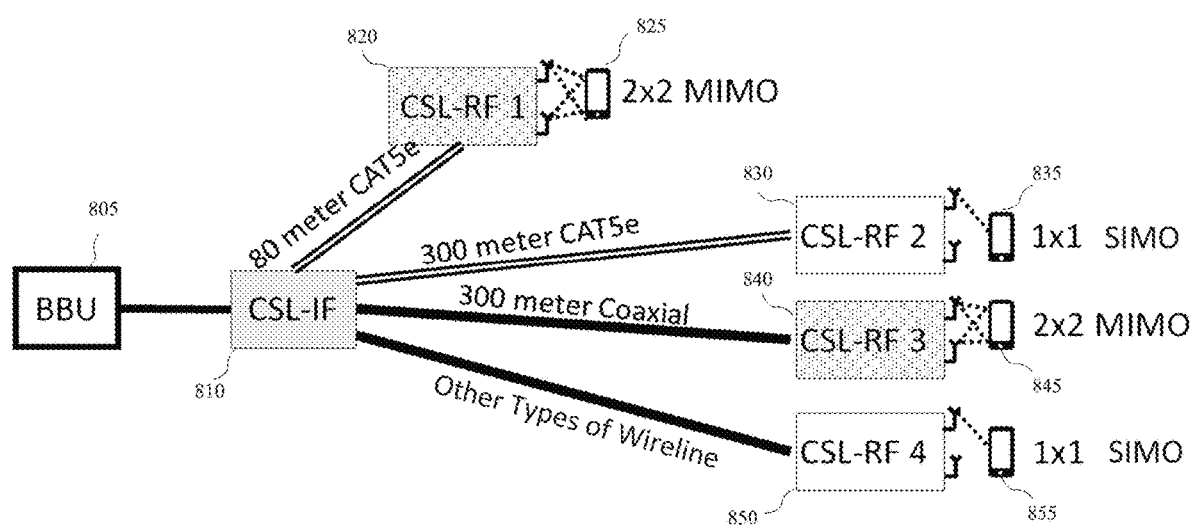
FIG. 8 shows an example in which a single CSL-IF unit is coupled to four CSL-RF units according to various embodiments of the invention.

In some embodiments, a single CSL-IF unit can be connected to a plurality of (i.e., two or more) CSL-RF units. In such embodiments, different CSL-IF/CSL-RF segments can have different preferred MIMO configurations. For example, FIG. 8 shows an example in which a single CSL-IF unit 810 is coupled to a BBU 805 and coupled to four CSL-RF units 820, 830, 840, 850. Specifically, the CSL-IF unit 810 is coupled to CSL-RF 1 820 over 80 meters of CAT5e cable, to CSL-RF 2 830 over 300 meters of CAT5e, to CSL-RF 3 840 over 300 meters of coaxial cable, and to CSL-RF 4 850 over 300 meters of coaxial cable that is shared with other technology/services occupying 100 MHz of bandwidth (e.g., between 0 and 100 MHz). As shown in FIG. 8, a common baseband is transmitted between the BBU 805 and the CSL-IF unit 810, but different signals are transmitted between the CSL-IF unit 810 and the various CSL-RF units 820, 830, 840, 850. The connections between the CSL-IF unit 810 and the various CSL-RF units 820, 830, 840, 850 may differ, resulting in different bandwidth and other transmission parameters, which can result in different preferred MIMO configurations being identified and implemented on each of the antenna arrays of the CSL-RF units 820, 830, 840, 850.

As shown in this example, 2×2 MIMO configurations are preferred for the connections between (a) the CSL-IF unit 810 and CSL-RF 1 820 and (b) the CSL-IF unit 810 and CSL-RF 3 840, whereas SISO configurations are preferred for the connections between (i) the CSL-IF unit 810 and CSL-RF 2 830 and (ii) the CSL-IF unit 810 and CSL-RF 4 850. Note that the preferred MIMO configuration for a segment between the CSL-IF and a selected CSL-RF is largely dependent on the corresponding wireline medium connecting the CSL-RF to the (common) CSL-IF.

In the case that different CSL-RF units 820, 830, 840, 850 are coupled to a common CSL-IF 810 unit in a CSL wireless-wireline system have different preferred MIMO configurations, the system may select or identify the set of one or more preferred MIMO configurations by jointly considering the preferred MIMO configurations associated with each of the multiple CSL-RFs 820, 830, 840, 850. As explained above, the set of preferred MIMO configurations can be communicated to the BBU as either a suggestion (which the BBU can ignore) or an instruction (which the BBU cannot ignore).

In some embodiments, the set of preferred MIMO configurations may only include a MIMO configuration selected from among the preferred MIMO configurations of the CSL-RFs requiring either (a) the least wireline bandwidth consumption, or (b) the least number of uplink spatial streams, or (c) the least number of downlink spatial streams, or (d) the lowest number of the sum of the number of uplink and downlink spatial streams. In some other embodiments, the set of preferred MIMO configurations may only include a MIMO configuration selected from among the preferred MIMO configurations of the CSL-RFs requiring either (i) the most wireline bandwidth consumption, or (ii) the most number of uplink spatial streams, or (iii) the most number of downlink spatial streams, or (iv) the largest number of the sum of the number of uplink and downlink spatial streams. In yet some other embodiments, the set of one or more preferred MIMO configurations may only include a MIMO configuration that is the most commonly preferred MIMO configuration among those of the CSL-RFs (e.g., a "majority vote" MIMO configuration).

Accordingly, the wireline portion of a wireless-wireline physically converged system can include a first distribution transceiver coupled to the intermediate transceiver by a first cable, and a second distribution transceiver coupled to the intermediate transceiver by a second cable. In this case, the indication of the at least one characteristic of the wireline portion conveys information about (a) at least one configuration suitable for the first cable, (b) at least one configuration suitable for the second cable, or (c) both (a) and (b). The at least one configuration suitable for the first cable or the at least one configuration suitable for the second cable can be based, for example, at least in part on a cable type, a cable length, or a cable bandwidth in use by or available to another technology.

In some embodiments, the wireline portion of a wireless-wireline physically converged system includes a first distribution transceiver coupled to the intermediate transceiver by a first cable, and a second distribution transceiver coupled to the intermediate transceiver by a second cable, where the first and second cables can be of different lengths and/or types. The intermediate transceiver can determine the set of one or more preferred configurations based at least in part on one or more of the first length, the second length, the first type, or the second type. The set of one or more preferred configurations may include at least one configuration suitable for both the first cable and the second cable. The first and second cables may have different usable bandwidths, and the set of one or more preferred configurations may include a configuration in accordance with the smaller amount of usable bandwidth.

When the intermediate transceiver is coupled to multiple distribution transceivers, the intermediate transceiver may be configured to transmit a first baseband stream to the first distribution transceiver over the first cable and transmit a second baseband stream to the second distribution transceiver over the second cable. The first and second baseband streams may be the same, or they may differ in some respect (e.g., they may have different numbers of spatial streams). In the uplink direction, the intermediate transceiver can combine the distinct upstream spatial streams it receives from the first and second distribution transceivers into a combined upstream spatial stream and transmit that combined upstream spatial stream to the base station.

In certain embodiments, the wireline portion of the wireless-wireline physically converged architecture comprises an intermediate transceiver connected to a plurality of distribution transceivers via a respective plurality of cables, and the process of determining one or more preferred configurations for the wireless portion of the wireless-wireline physically converged architecture can comprise determining, for each of the plurality of cables, a respective at least one preferred MIMO configuration. The determination of at least one preferred MIMO configuration for each of the plurality of cables may include, for example, choosing, from among all of the respective at least one preferred MIMO configurations and based on at least one criterion, the MIMO configuration that (1) achieves the highest throughput across the entire wireless-wireline link, (2) uses the least amount of wireline bandwidth or the most amount of wireline bandwidth, (3) the least number of uplink spatial streams or the most number of uplink spatial streams, (4) the least number of downlink spatial streams or the most number of downlink spatial streams, (5) the least total number of uplink and downlink spatial streams or the most total number of uplink and downlink spatial streams, (6) less than a threshold amount of wireline bandwidth or more than the threshold amount of wireline bandwidth, (7) fewer than a threshold number of uplink spatial streams or more than the threshold number of uplink spatial streams, (8) fewer than a threshold number of downlink spatial streams or more than the threshold number of downlink spatial streams, (9) fewer than a threshold total number of uplink and downlink spatial streams or more than the threshold total number of uplink and downlink spatial streams, and/or (10) a majority-preferred MIMO configuration.

As explained above and illustrated in the example of FIG. 8, in embodiments in which a single CSL-IF unit 810 is coupled to a plurality of CSL-RFs 820, 830, 840, 850 with different preferred MIMO configurations, the CSL-IF unit 810 may receive a downlink baseband stream from the BBU 805 and may send an uplink baseband stream to the BBU 805. In such embodiments, a CSL-IF unit 810 receiving the common downlink baseband stream may send the same baseband stream to each CSL-RF unit 820, 830, 840, 850 coupled to it, or it may send different baseband streams to different CSL-RF units 820, 830, 840, 850 coupled to it. Referring to the example of FIG. 8, the CSL-IF unit 810 may receive two spatial streams from the BBU 805 in the downlink direction and may send both spatial streams to CSL-RF 1 820, whereas it may only send one spatial stream to CSL-RF 2 830 (for which the preferred MIMO configuration is 1×1). As another example, referring to FIG. 8, the CSL-IF unit 810 may receive uplink signals with one and two spatial streams, respectively, from CSL-RF1 820 and CSL-RF 2 830, and may send all spatial streams to the BBU 805 (after combining all the spatial streams received from all four CSL-RF units 820, 830, 840, 850 into a single uplink signal).

Figure 9:
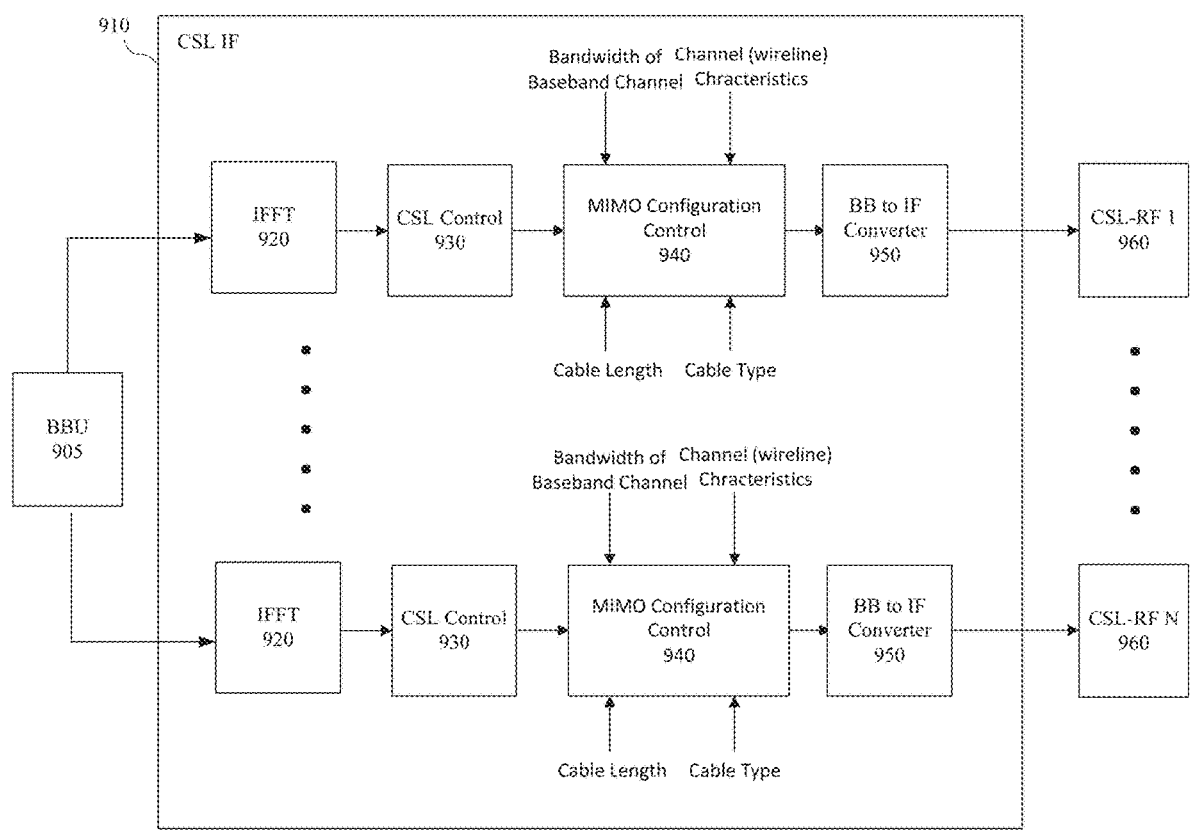
FIG. 9 illustrates an exemplary CSL-IF unit according to various embodiments of the invention.

FIG. 9 illustrates an exemplary CSL-IF unit according to various embodiments of the invention. As shown the CSL-IF unit 910 is coupled to a baseband unit 905 and receives downlink data/control information and transmits uplink data/control information. One or more transmission paths are defined within the CSL-IF unit 910. As shown, exemplary transmission paths comprise an inverse fast Fourier transform block (IFFT) 920 that coverts a received signal from a frequency domain vector signal to a time domain vector signal. A CSL control block 930 processes various control information relating to the operation of the CSL-IF unit, the CSL-RF unit, the baseband unit or other devices related to the CSL wireless-wireline system.

A MIMO configuration control 940 is coupled within a signal path within the CSL-IF unit 910. The MIMO configuration control 940 may receive one or more inputs of cable length corresponding to a wireline segment, cable type corresponding to the wireline segment, bandwidth information of the baseband channel and other wireline channel characteristics that may be used to align wireline bandwidth and parameters to a configurable MIMO antenna array at a CSL-RF unit 960. The MIMO configuration control receives this information and calculates a SIMO/MIMO configuration based on an analysis to better align this configuration to the parameters of the wireline parameters. In certain embodiments, this configuration information is communicated to the CSL-RF unit 960 for further processing and/or implementation within the antenna array. In these embodiments, this configuration information is converted to an IF signal at a baseband to IF converter 950 either as a discrete control signal or information embedded within a control or data field. In other embodiments, this configuration information is transmitted to the BBU 905 in an uplink signal for analysis at the base station. In these embodiments, the base station/BBU determines a MIMO configuration based at least in part on the received configuration information from the MIMO configuration control 940.

According to various embodiments, the SIMO/MIMO configuration information is generated using one or more processes described above. In other embodiments, system performance is directly measured across a variety of different configurations and the SIMO/MIMO configuration information is identified by performing a series of test/initialization procedures in which the different SIMO/MIMO configurations are analyzed and a preferred configuration is selected.

Figure 10:
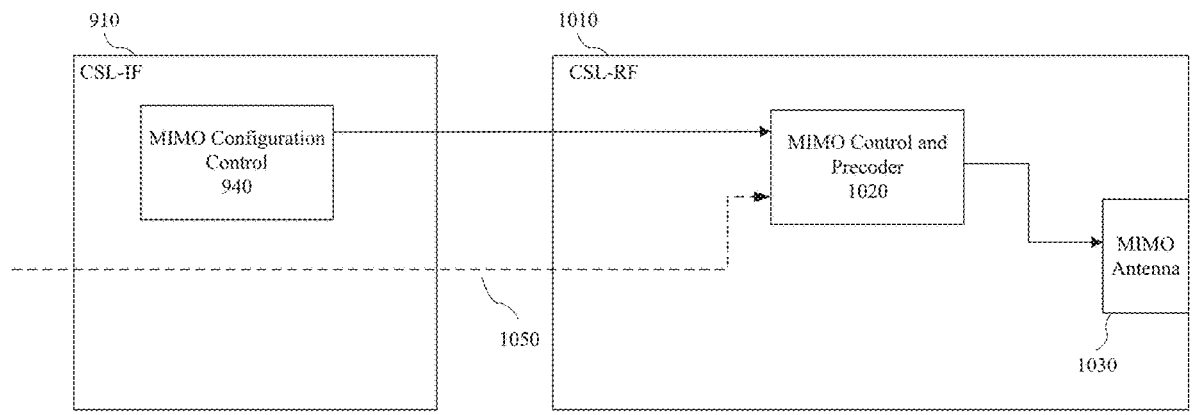
FIG. 10 illustrates an exemplary CSL-IF unit and CSL-RF unit according to various embodiments of the invention.

FIG. 10 illustrates an exemplary CSL-RF block according to various embodiments of the invention. As shown, the CSL-RF block 1010 is coupled to transmit and receive data/control information with a CSL-IF block 910. As previously described, this communication may occur in the control plane or the data plane. In certain embodiments, SIMO/MIMO configuration information is transmitted from a MIMO configuration control 940 to a MIMO control and precoder 1020 within the CSL-RF 1010. The MIMO control and precoder 1020 receives this information and generates control information, including possible precoder weights that are applied to an antenna array, that are applied to the MIMO antenna 1030.

In other embodiments, MIMO configuration information is generated at a base station (based at least partially on SIMO/MIMO configuration information generated at the MIMO configuration control 940) and transmitted to the MIMO control and precoder 1020. The MIMO control and precoder applies this information to the MIMO antenna 1030.

The coordination between the CSL-IF 910 and the CSL-RF 1010 allows for a configurable SIMO/MIMO antenna to be configured based at least in part on wireline performance characteristics to better align bandwidth (and other parameters) across a wireline segment and a wireless segment.

It is to be understood that although the disclosures herein are largely in the context of CSL and a wireless-wireline converged architecture, the disclosures are not limited to the described environments or applications. Furthermore, although certain 3GPP/cellular terminology and acronyms or initialisms are used herein (e.g., RB, BBU, RAN, MCS, UE, etc.), those having ordinary skill in the art will understand that other terms may be used in other contexts (e.g., Wi-Fi, IEEE 802.11 standards, etc.). For example, in multi-carrier systems (such as those that use orthogonal frequency division multiplexing or discrete multitone modulation), a resource block (which may also be referred to as a resource element) is simply a quantity of time and frequency that can be assigned to a device. It is to be appreciated that resources allocated for communication over a channel can be described in other ways.

In the foregoing description and in the accompanying drawings, specific terminology has been set forth to provide a thorough understanding of the disclosed embodiments. In some instances, the terminology or drawings may imply specific details that are not required to practice the invention.

The term "intermediate transceiver" is a device that couples a BBU to a wireline segment and facilitates measurement of parameters on the wireline segment related to bandwidth by transmitting test signals on the wireline segment that are used to measure and/or calculate these parameters. The CSL-IF unit is one example of an intermediate transceiver. The term "distribution transceiver" is a device that couples a wireline segment to a wireless segment and that has a configurable MIMO antenna used to transmit and/or receive wireless signals from at least one device. The CSL-RF unit is one example of a distribution transceiver.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used herein, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

The terms "exemplary" and "embodiment" are used to express examples, not preferences or requirements. The term "coupled" is used herein to express a direct connection/attachment as well as a connection/attachment through one or more intervening elements or structures.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The foregoing description of the invention has been described for purposes of clarity and understanding. It is not intended to limit the invention to the precise form disclosed. Various modifications may be possible within the scope and equivalence of the appended claims.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

What is claimed is:

1. A wireless-wireline physically converged system, the wireless-wireline physically converged system comprising:
    a baseband unit;
    a wireline segment coupled to the baseband unit, the wireline segment comprising an intermediate transceiver, a distribution transceiver, and a wireline cable coupling the intermediate transceiver to the distribution transceiver; and
    a wireless segment coupled to the wireline segment by the distribution transceiver, the wireless segment comprising at least one wireless channel communicatively coupling the distribution transceiver to at least one user equipment,
    wherein the intermediate transceiver:
    obtains at least one parameter of the wireline segment, and
    configures at least one setting related to an antenna array within the distribution transceiver based at least in part on the at least one parameter of the wireline segment.

2. The wireless-wireline physically converged system of claim 1 wherein the at least one setting related to the antenna array comprises a multiple-input, multiple-output (MIMO) setting for the wireless channel.

3. The wireless-wireline physically converged system of claim 2 wherein the MIMO setting comprises at least one of a bandwidth parameter, a number of layers, a number of transmitters, and a number of receivers.

4. The wireless-wireline physically converged system of claim 1 wherein the at least one wireline parameter relates to bandwidth characteristics of the wireline segment.

5. The wireless-wireline physically converged system of claim 4 wherein the at least one wireline parameter comprises at least one of a cable length and cable type.

6. The wireless-wireline physically converged system of claim 5 wherein the intermediate transceiver implements an attenuation profile corresponding to a cable related to the wireline segment.

7. The wireless-wireline physically converged system of claim 1 wherein the intermediate transceiver sends the at least one parameter of the wireline segment to the baseband unit.

8. The wireless-wireline physically converged system of claim 1 wherein the intermediate transceiver determines the at least one parameter of the wireline segment during an initialization procedure.

9. The wireless-wireline physically converged system of claim 1 wherein the intermediate transceiver sends the at least one parameter of the wireline segment to at least one of the distribution transceiver and the baseband unit.

10. The wireless-wireline physically converged system of claim 9 wherein the baseband unit or cloud server obtains the at least one parameter of the wireline segment from a look-up table.

11. The wireless-wireline physically converged system of claim 1 wherein the intermediate transceiver comprises a cellular subscriber line intermediate frequency (CSL-IF) unit and the distribution transceiver comprises a first cellular subscriber line radio frequency (CSL-RF) unit.

12. The wireless-wireline physically converged system of claim 1 wherein the intermediate transceiver communicates with a plurality of distribution transceivers.

13. The wireless-wireline physically converged system of claim 1 wherein the distribution transceiver communicates with a plurality of user equipment devices.

14. A method for configuring an antenna array on a distribution transceiver based at least in part on a corresponding wireline segment, the method comprising:

obtaining at least one parameter related to a wireline segment of a wireless-wireline physically converged architecture; and configuring at least one setting of the antenna array coupled within the distribution transceiver based at least in part on the at least one parameter of the wireline segment.

15. The method of claim 14 wherein the at least one setting of the antenna array comprises a multiple-input, multiple-output (MIMO) configuration.

16. The method of claim 14 wherein the at least one setting of the antenna array relates to operation in a MIMO configuration or a SIMO configuration.

17. The method of claim 14 wherein the at least one parameter comprises a type, size, or length of a cable of the wireline segment of the wireless-wireline physically converged architecture.

18. The method of claim 14 wherein the at least one parameter comprises at least one of a cable type and cable length corresponding to the wireline segment.

19. The method of claim 18 wherein the at least one parameter comprises an attenuation profile of a cable in the wireline segment.

20. The method of claim 18 wherein obtaining the at least one parameter comprises accessing a look-up table.

* * * * *